United States Patent [19]

Kirschman et al.

[11] 4,089,750
[45] May 16, 1978

[54] WATER DISTILLER WITH CONE SHAPED CONDENSER

[76] Inventors: Fred C. Kirschman, Briardale Rte. 2, Bismarck, N. Dak. 58501; Wallace B. Bolte, Box 204, Regent, N. Dak. 58650

[21] Appl. No.: 711,791

[22] Filed: Aug. 5, 1976

[51] Int. Cl.² .............................................. B01D 3/00
[52] U.S. Cl. ............................ 202/180; 202/185 C; 202/190; 203/2; 203/10
[58] Field of Search .............. 202/190, 160, 187, 180, 202/191–193, 194, 185 C; 203/DIG. 17, 10, 11, 2, DIG. 18

[56] References Cited

U.S. PATENT DOCUMENTS

| | | | |
|---|---|---|---|
| 587,506 | 8/1897 | Pierce et al. | 203/DIG. 17 |
| 650,501 | 5/1900 | Bailey | 203/DIG. 17 |
| 662,765 | 11/1900 | Chase | 202/190 |
| 697,912 | 4/1902 | Chase | 203/DIG. 17 |
| 790,901 | 5/1905 | Keith | 202/193 |
| 825,178 | 7/1906 | Barnstead | 202/190 |
| 882,811 | 3/1908 | Bailey | 202/192 |
| 1,369,438 | 2/1921 | Jewell | 203/DIG. 17 |
| 1,372,865 | 3/1921 | Crane | 203/DIG. 17 |
| 2,467,174 | 4/1949 | Wilson | 203/2 |
| 3,345,271 | 10/1967 | Shay et al. | 203/2 |

Primary Examiner—Wilbur L. Bascomb, Jr.
Attorney, Agent, or Firm—Dugger, Johnson & Westman

[57] ABSTRACT

A water distiller arrangement which provides for an efficient distillation process wherein the inlet water supply is controlled as a function of the temperature of the output of the distiller, and inlet water is preheated in an interior chamber surrounded by a passageway through which the water vapor passes after leaving the boiling chamber and while it condenses.

12 Claims, 2 Drawing Figures

000
WATER DISTILLER WITH CONE SHAPED CONDENSER

BACKGROUND OF THE INVENTION

1. Field of the Invention

The present invention relates to home water distillers.

2. Prior Art

Various water distillers have been advanced in the prior art. A discussion of the prior art appears in the introductory portions of our copending application Ser. No. 681,051, filed Apr. 28, 1976. While embodying many of the principles set forth in our copending application, the present application includes improvements in the physical arrangement of the parts to achieve the optimum result in both manufacturing costs and performance.

SUMMARY OF THE INVENTION

The present invention relates to an arrangement for a home water distiller wherein the distiller includes a preheat chamber for preheating inlet water, a boiling chamber, and a funnel shaped condensing chamber that surrounds the preheat chamber (which is also funnel or cone shaped) so that the water vapor from the boiling chamber must pass next to the preheat chamber wall to preheat the inlet water as it condenses. The distilled water passes over a heat sensor or thermostat that in turn operates a valve to control the inlet water as a function of the output (distilled) water temperature. When the output water temperature gets up to a predetermined level, the inlet water valve will be opened to let more cold water or raw water into the preheat chamber, and thence to the boiling chamber.

The unit is quite compact because of the inclusion of the preheat chamber and condensing chamber in spaces that normally would be unoccupied in distillers where the chambers are stacked one on top of the other, and at the same time the construction is simplified and assembly time and costs reduced.

DESCRIPTION OF THE PREFERRED EMBODIMENT

Figure 1:
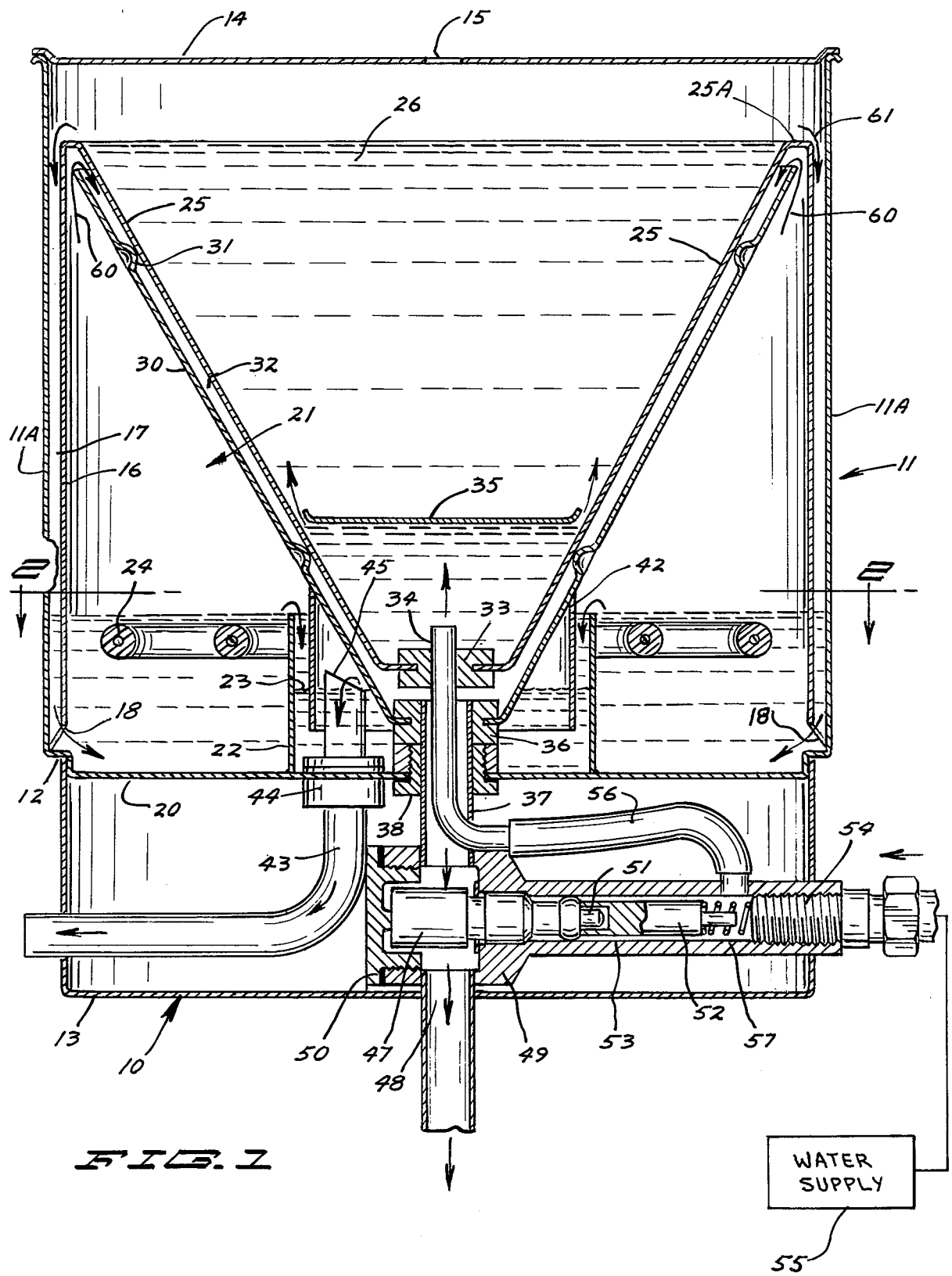
FIG. 1 is a vertical sectional view through a typical home distiller made according to the present invention.
Figure 2:
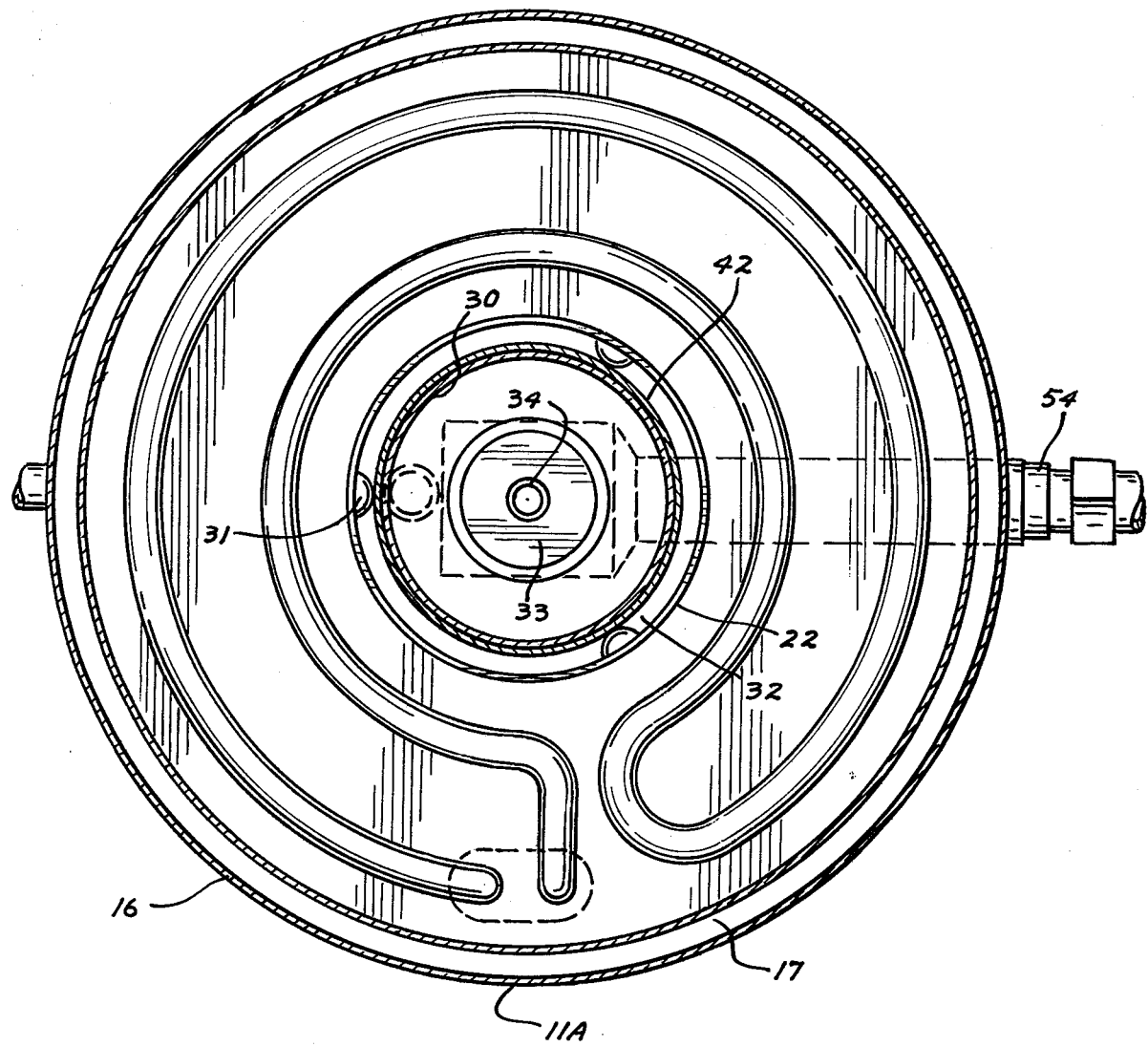
FIG. 2 is a sectional view taken as on line 2—2 in FIG. 1.

Referring to FIG. 1, the home water distiller illustrated generally at 10 includes an outer housing or compartment 11 that is generally cylindrical shaped, and has an outer wall 11A and an inwardly formed shoulder 12 at the lower portion thereof. A base ring or support 13 fits against the exterior of shoulder 12 and supports the housing 11 in the desired manner. The housing 11 is open topped to form an open top tank, and a cover 14 mounts thereon. A vent opening 15 is provided in the center of the cover for permitting gases and vapors to escape without building up pressure on the interior of the compartment 11. The outer wall 11A of housing 11 forms the outer wall of a boiling chamber, and as can be seen an inner wall 16, which is concentric with but spaced from the wall of the housing 11, is positioned inside the chamber 11, and this forms a passageway 17 between the wall 16 and the wall 11A of housing 11. This passageway 17 is an annular passageway that extends around the housing 11 and if desired suitable spaced support portions or tabs indicated generally at 18 near the lower portion of inner wall 16 can be used for supporting the wall 16, and keeping it spaced from the wall 11A. The tabs 18 as shown are supported on the inwardly bent section forming the shoulder 12 at the lower portion of the housing 11.

A lower wall indicated generally at 20 of housing 11 becomes the bottom wall of the boiling chamber which is generally indicated at 21. An annular wall 22 is sealed to the bottom wall 20, near the central axis, and forms an annular chamber or cup. Thus, the boiling chamber 21 in which water indicated at 23 is kept for boiling, forms a ring around the outer surface of the wall 22. A suitable electric heating unit 24 is included. A Cal-Rod unit of normal design is utilized, and suitable electrical connections can be passed through the bottom wall 20 for connecting to a power source for powering the Cal-Rod unit and heating the water.

The wall 16 also supports a generally conical shaped wall 25 which defines an interior preheat chamber indicated generally at 26 that extends downwardly toward the bottom wall of the boiling chamber. The wall 25 has a flange 25A around its upper edge that is supported on the wall 16 as shown and which flange closes off the upper end of the boiling chamber. The wall 25 forming the conically shaped preheat chamber can be formed in different cross-sectional shapes and also supported in different ways. A second conically shaped wall 30 is provided on the outside of the wall 25, and is spaced from wall 25, for example, with small inwardly bent spacing protuberances 31, so that the wall 30 defines a conically shaped passageway 32 between the outer surface of the wall 25 and the inner surface of wall 30.

At the lower end of the preheat chamber, a suitable gasket or plug 33 closes off a provided opening. The gasket 33 also has a central opening that sealingly receives an inlet water tube 34. The inlet water tube 34 is positioned below a baffle plate 35 mounted on wall 25 in spaced locations, which deflects inlet water that is introduced through the tube 34 outwardly toward the edges of the preheat chamber 26 formed by the wall 25. The baffle plate 35 can be supported in a suitable manner with adequate space along its edges so water can flow past the edges of the baffle plate.

A gasket or plug type fitting 36 is also provided at the lower end of the wall 30, to close off an opening at this lower end. The plug 36 in turn supports a tube 37 that extends through a packing nut and sealing arrangement 38 and out through the bottom wall 20 of the chamber 25, as shown. The tube 37 forms a drain tube for the chamber 32, as will be explained.

The wall 30 also has an annular baffle wall 42 mounted thereon near the lower portions, and the baffle wall 42 is concentric with and spaced inwardly from the wall 22. An overflow drain tube 43 opens to the region within wall 42, and passes through the bottom wall 20 through a suitable sealing arrangement indicated at 44. The drain tube 43 has an angled or beveled upper end portion 45 to establish a desired water level in the drain chamber. The tube 43 is connected to a suitable household drain or other drain for disposal of overflow water that is flushed through the system to keep mineral content to a minimum.

A heat sensor indicated generally at 47 is mounted in a chamber 48 formed as part of the tube 37, through the use of a fitting indicated at 49 and a nut 50 that tightens on the fitting. This heat sensor 47 is of the so-called wax motor type, made for example by Robertshaw Controls Company, Knoxville, Tennessee, which includes an element indicated generally at 51 which moves linearly on expansion (or contraction) of the capsule end of the sensor that is located in the chamber 48. Linear movement of this end 51 in turn moves an actuator 52 mounted inside a tubular passageway 53, which end 51 in turn controls a check valve assembly 54. Inlet water from a water supply 55 is connected through the check valve 54 and connecting hose 56 to the inlet water supply tube 34.

The check valve 54 can be of any desired type and preferably is a type resembling a pneumatic tire valve. A suitable check valve is made by Foster Manufacturing Company, Inc., Springfield, Missouri. A ball check valve that operates on a seat inside the valve housing also may be used. A suitable spring 57 can be provided to return the actuator 52 to its retracted position when the heat sensor 47 contracts due to cooling.

The operation of the temperature control arrangement is similar to that shown in our copending application Ser. No. 681,051, filed Apr. 28, 1976, as previously mentioned. When the temperature of the heat sensor 47 is below a certain level, check valve 54 will be closed; when the temperature exceeds a desired level the inlet check valve is opened automatically for a continuous operation.

In operation, water can be added by taking cover 14 off for initial start up, to make sure that the heat coils 24 are submerged. As can be seen, the water level in the boiling chamber is controlled by the height of the upper edge of the wall 22, as shown. The heated water vapor will rise to the top of the boiling chamber 21, near the upper edge of the wall 30 and will pass between the upper edge of the wall 30 and the wall 16 as shown by the arrows 60. The vapors will then tend to start to cool and condense because of the presence of cooler water in chamber 26. When the vapor condenses distilled water will flow down in the passageway 32 along the upper surface of the conical wall 30 toward the lower end. This will cause an output of distilled water through the tube 37, and into the chamber 48 to cause the heat sensor 47 to be heated (as the temperature of the distilled water rises). When the unit is in operation the water in chamber 26 will be heated substantially and the distilled water coming out tube 37 will be slightly below the boiling point. When the distilled water reaches the operating temperature the sensor 47 will expand and move the actuator 51 to open check valve 54 to permit inlet water to flow in through the tube 34. The preheat chamber will be refilled with cold water until such time as the vapors or liquid passing through the chamber 48 cools to a preset level at which time the valve 54 will be closed and no more cold water will be admitted.

When cold water is added through check valve 54 and tube 34, the preheated water in chamber 26 will flow over flange 25A and through the passageway 17 as shown by the arrow 61, and enter the boiling chamber at the bottom of the boiling chamber as shown by arrows at the lower openings of wall 16 formed by tabs 18. This additional water will cause the interior water level in the boiling chamber to raise, and excess water will flow out over the top of the wall 22 as also indicated by arrows in FIG. 1, and into the chamber defined by the wall 22, which is a drain chamber. When the water level in the drain chamber reaches the height of the lower edge of the cut off end portion 45 of the drain tube 43, water will be flushed out to drain. This flushing action will continue during operation to keep mineral buildup in the boiling chamber to a low level. The water vapors or steam will pass as shown by the arrows 60 into the condensing passageway, and be condensed by the cooler water in the preheat chamber (which also warms the water) and then be discharged out through the pipe 37 that leads to the distilled water supply.

The funnel shaped preheat chamber provides a means of using the normally wasted space at the top of the boiling chamber, and the condensing chamber formed by wall 30 on the outside of wall 25 of chamber 26 provides adequate condensing area without needing a coil. The condensation takes place adjacent wall 25 because the wall 30 is near the temperature of the boiling chamber.

The use of baffle walls 42 in the drain chamber reduces sputtering at the drain as the distiller operates. Yet by proper selection of components a regulated flushing of the boiling chamber is achieved.

The shape of the preheat chamber is not limited to conical taper and if desired can have upright walls. The condensing chamber 32 serves to collect the condensed vapor and direct it to the desired location for distilled water.

What is claimed is:

1. A distiller apparatus comprising an outer housing forming a first interior chamber, means to heat water within said first interior chamber, first funnel shaped wall means positioned at least partially within said interior chamber and forming a second liquid retaining preheat chamber, the narrow portions of said funnel shaped wall means being at the lower end thereof, means to admit liquid to be distilled into said second chamber, passage means between said second chamber and said first interior chamber to permit liquid to flow from said second chamber to said first interior chamber when the liquid in the second chamber reaches a desired level, second funnel shaped wall means mounted with respect to said housing, said first funnel shaped wall means being nested within said second funnel shaped wall means and spaced therefrom to form a collector passageway between the first and second funnel shaped wall means, said collector passageway surrounding said first funnel shaped wall means and extending along substantially the entire length of said first funnel shaped wall means, said collector passageway having an inlet opening surrounding the upper portions of the first funnel shaped wall means open to the interior chamber to provide a path for vapor to travel from the interior chamber through the passageway to an outlet opening positioned adjacent the lower end of said second funnel shaped wall means, said collector passageway being closed except for its inlet and outlet openings to collect condensed liquid and to permit flow of condensed liquid to said outlet opening.

2. The combination as specified in claim 1 wherein said first and second funnel shaped wall means are both generally frusto-conical shaped, and said housing comprising a cylindrical wall means surrounding the major portion of said first and second funnel shaped wall means.

3. The combination as specified in claim 2 wherein said collector passageway comprises a narrow annular passageway between said first and second funnel shaped wall means.

4. The combination in claim 1 and a liquid inlet leading to the second chamber formed by said first funnel shaped wall means, said inlet being adjacent the lower portions of said first funnel shaped wall means to permit introducing cold liquid to be distilled adjacent the lower portions of said first wall means.

5. The combination specified in claim 4 and means to sense the temperature of condensed liquid passing out the outlet of said passageway, control valve means for controlling flow of cold liquid to said second chamber, means coupling said heat sensitive means and said control valve means to cause said control valve means to be open to admit cold liquid to said second chamber when the sensed temperature exceeds a desired level.

6. The combination as specified in claim 1 wherein said first interior chamber, said first funnel shaped wall means, and said second funnel shaped wall means have a substantially common central axis.

7. The combination as specified in claim 1 wherein said first funnel shaped wall means is generated about a central axis that is substantially centered with respect to the interior chamber.

8. The combination as specified in claim 7 wherein said passage means from said second chamber to the first interior chamber is adjacent the upper edges of said first funnel shaped wall means, and comprises an annular passageway extending around and adjacent to the periphery of said first interior chamber.

9. A distiller apparatus comprising a housing having an outer peripheral wall forming an interior chamber, heating means in the interior chamber to permit vaporizing a liquid to be distilled, a first funnel shaped wall forming a first chamber adjacent the center portions of said interior chamber, said first funnel shaped wall being of larger cross-sectional area adjacent the upper portions thereof and tapering to a small cross-sectional area adjacent the lower portion thereof, means forming a liquid inlet to said first chamber adjacent the lower portions thereof, said first funnel shaped wall being spaced from said outer peripheral wall in desired locations to provide a first passageway for liquid to flow over the upper edges of said first funnel shaped wall into the interior chamber, means to supply a liquid to be distilled to said liquid inlet, a second wall shaped complementary to and spaced outwardly from the first funnel shaped wall in surrounding relation thereto forming a second passageway between said first and second walls extending along a substantial portion of said first wall, means adjacent the upper portions of said second wall providing an opening to the second passageway from the interior chamber, and means at the lower portion of said second wall to provide an outlet for liquid from said second passageway.

10. The distiller of claim 9 wherein said means to supply liquid to be distilled to said first chamber includes valve means, and actuator means for said valve means including a temperature sensitive portion opening said valve means in response to temperature adjacent said outlet from said second passageway in excess of a preselected level.

11. The distiller of claim 9 and drain means leading from said interior chamber including an open topped receptacle at the bottom of said interior chamber having an upper edge at the desired water level in the interior chamber, a baffle wall forming a compartment closed at the top and having an opening below the level of said upper edge on the interior of said receptacle, and means forming a drain passageway closed from the interior chamber except for a drain opening open to said compartment above the opening between the compartment and the receptacle.

12. The combination specified in claim 9 and a third wall generally concentric to and spaced inwardly from the outer peripheral wall forming a narrow annular passageway with respect to the interior of said outer peripheral wall, said narrow annular passageway receiving liquid that flows over the upper edges of said first funnel shaped wall, and said third wall forming an inlet opening to said interior chamber below the normal level of liquid in said interior chamber.

* * * * *